United States Patent [19]

Korona et al.

[11] Patent Number: 4,822,070
[45] Date of Patent: Apr. 18, 1989

[54] AUXILIARY WHEEL ASSEMBLY

[76] Inventors: Stanley J. Korona; Sue M. Korona, both of 4745 Cecil, G32Detroit, Mich.

[21] Appl. No.: 66,869

[22] Filed: Jun. 25, 1987

[51] Int. Cl.$^4$ .............................................. B62B 5/00
[52] U.S. Cl. ................................ 280/47.2; 280/659; 280/DIG. 4
[58] Field of Search ............... 280/641, 645, 652, 659, 280/47.2, 47.24, DIG. 3, DIG. 4, 767

[56] References Cited

U.S. PATENT DOCUMENTS

| | | | |
|---|---|---|---|
| 1,100,702 | 6/1914 | Holmes | 280/47.2 |
| 2,155,896 | 4/1939 | Goldman | 280/641 |
| 2,693,968 | 11/1954 | Bateman et al. | 280/651 |
| 2,918,295 | 12/1959 | Milner | 280/652 |
| 3,064,990 | 11/1962 | Salvucci | 280/47.2 |
| 3,460,850 | 8/1969 | Franklin | 280/47.2 |
| 3,627,344 | 12/1971 | Rizzuto | 280/47.2 |
| 3,774,929 | 11/1973 | Stanley | 280/641 |
| 3,936,068 | 2/1976 | Dorman | 280/652 |
| 4,358,123 | 11/1982 | Richards | 280/47.2 |
| 4,630,837 | 12/1986 | Kazmark | 280/47.2 |

FOREIGN PATENT DOCUMENTS

| | | | |
|---|---|---|---|
| 125961 | 11/1947 | Australia | 280/47.2 |
| 845839 | 8/1952 | Fed. Rep. of Germany | 280/641 |
| 3506205 | 8/1986 | Fed. Rep. of Germany | 280/47.2 |
| 686258 | 7/1930 | France | 280/47.2 |
| 82434 | 9/1953 | Norway | 280/47.2 |
| 1035545 | 7/1966 | United Kingdom | 280/652 |
| 1056619 | 1/1967 | United Kingdom | 280/641 |

Primary Examiner—Charles A. Marmor
Assistant Examiner—Brian L. Johnson
Attorney, Agent, or Firm—Harness, Dickey, Pierce

[57] ABSTRACT

An auxiliary wheel assembly for manually propelled wheeled carriers is disclosed. The assembly includes a frame having a mechanism to removably secure the frame to the manually propelled wheeled carrier. Also, at least one wheel is coupled with the frame which provides additional stability to the manually propelled carrier and distributes the load from the wheels of the manually propelled carrier to the wheel of the assembly. Further, a bracket may be coupled with the frame and the manually propelled carrier to move the assembly from a first use position to a second collapsible non-use position.

4 Claims, 2 Drawing Sheets

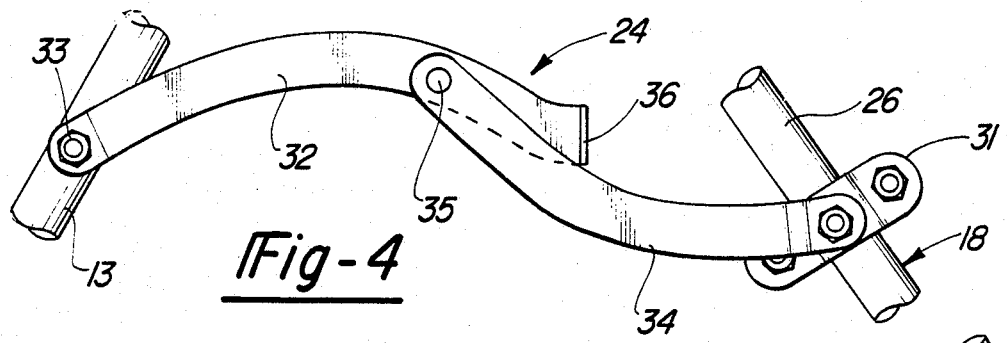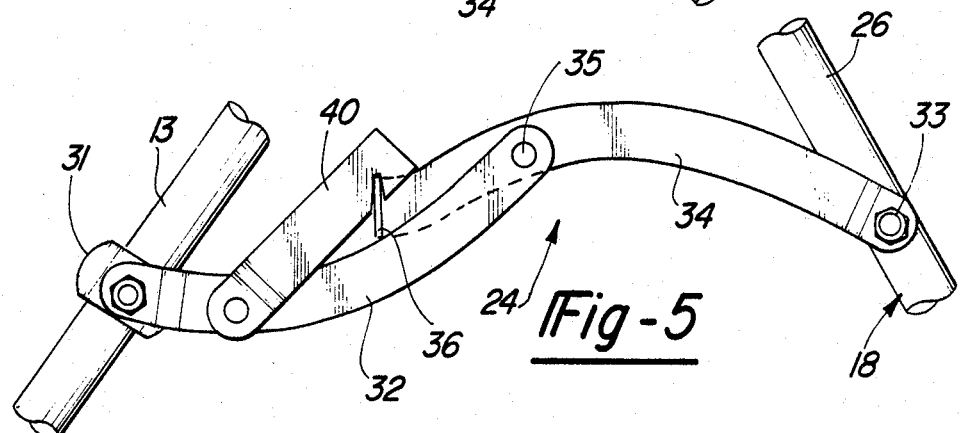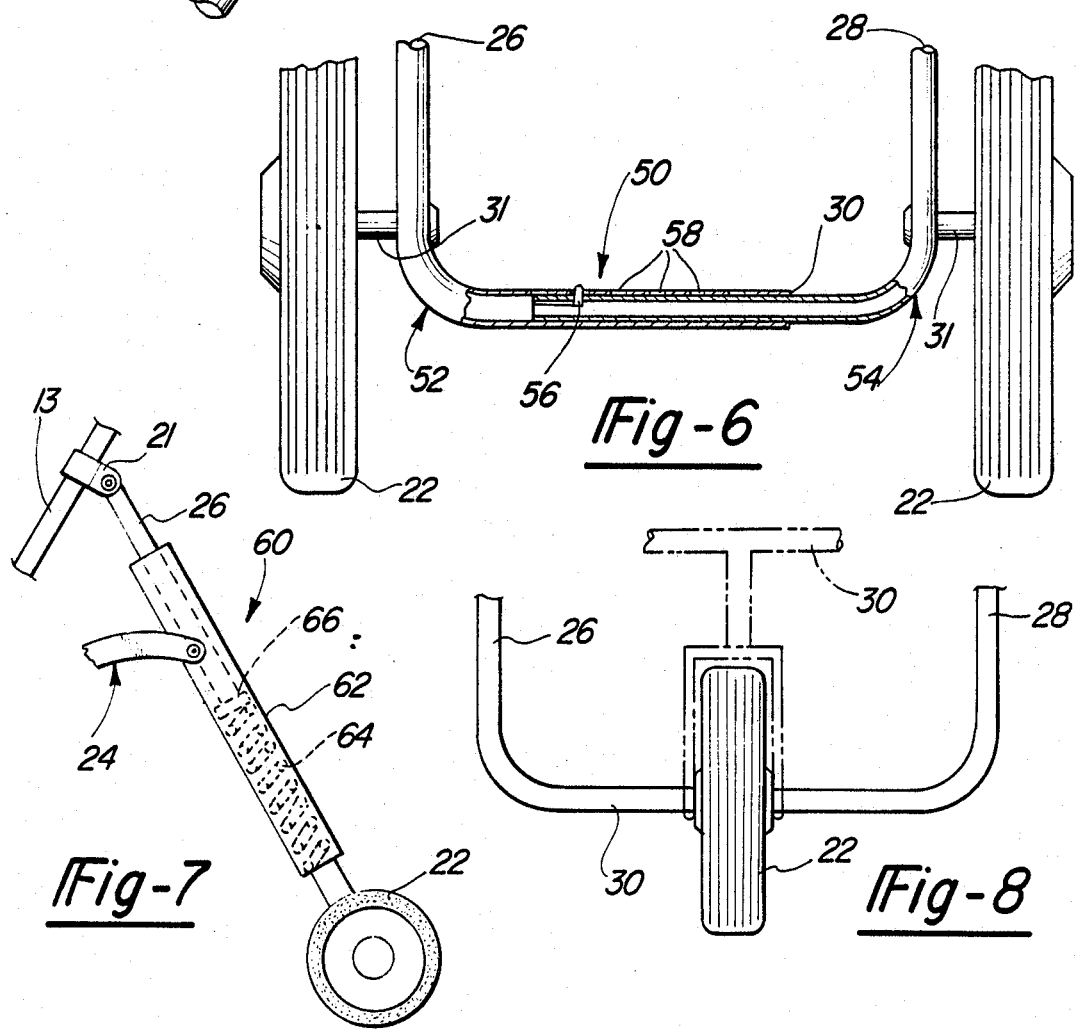

AUXILIARY WHEEL ASSEMBLY

BACKGROUND AND SUMMARY OF THE INVENTION

The present invention relates to wheel assemblies and, more particularly, to auxiliary wheel assemblies for manually propelled wheeled vehicles Several types of manually propelled wheeled vehicles exist which carry groceries, luggage, or the like. Generally, these apparatuses include a frame, pair of wheels attached to the frame to enable movement and a stop or rest to enable the device to be retained in an upright position when the wheels are not in use. When the wheels of the device are in a use position, the user generally pushes or pulls the device on its wheels. When the device is being pushed or pulled, the wheels are on the ground and the handle is on the frame above the wheels. Also as the device is pushed or pulled, a load is created on the frame by the weight of the groceries, luggage or the like. As the load increases, the downward force on the handle increases. Elderly users of grocery carts and the like generally cannot sustain this increased force on the handle. Thus, the increased force causes the elderly user to lose control of the cart causing the spillage of their groceries or the like.

Several types of carriers have been introduced that have wheels positioned behind the standard carrier wheels for enhancing the stability of the device. The following U.S. patents illustrate relevant art. The U.S. patents are as follows: U.S. Pat. Nos. 2,155,896; 2,693,968; 2,918,295; 3,064,990; 3,460,850; 3,627,344; 3,774,929; and 4,630,837.

While the above art discloses three and four-wheeled carriers, the art has several disadvantages. One disadvantage is that several of the carriers are noncollapsible; they are always extended in a use position. The carriers that are collapsible, however, may only be utilized on that particular device. Also, the carriers do not provide a universal assembly that may be moved from one carrier to another.

Accordingly, it is an object of the present invention to overcome the disadvantages of the described art. The present invention provides the art with an auxiliary wheel assembly that may be moved from carrier to carrier to provide the carrier with additional stability and to spread the carrier load among more wheels. Also, the present invention provides the art with an auxiliary wheel assembly that is removably secured to a carrier device which may be moved from a use position to an out-of-the-way non-use or storage position.

The present invention provides the art with a new and improved auxiliary wheel assembly. The wheel assembly of the present device includes a U-shaped frame member. A mechanism to removably secure the frame to a manually propelled wheeled vehicle or carrier is positioned adjacent to the free ends of the legs of the U-shaped frame. At least one wheel is associated with the frame to provide additional stability to the manually propelled carrier and to spread out the load of the manually propelled wheel carrier among another wheel.

A mechanism for enabling size expansion and reduction of the base of the U-shaped frame which, in turn, enables the legs of the frame to move toward and away from one another may be included. Also, a bracket may be secured to the frame and the manually propelled wheel device to enable the wheel of the auxiliary wheel assembly to move from a use to a non-use position.

From the subsequent description and the appended claims taken in conjunction with the accompanying drawings, additional objects and advantages of the present invention will become apparent to one skilled in the art.

BRIEF DESCRIPTION OF THE DRAWINGS

FIG. 4 is a side elevation view of a bracket in accordance with the present invention.

FIG. 5 is a side elevation view of a lock bracket in accordance with the present invention.

FIG. 6 is a front elevation view partially in cross-section of an expandable frame in accordance with the present invention.

FIG. 7 is a side elevation view of an absorber frame in accordance with the present invention.

FIG. 8 is a front elevation view of an auxiliary wheel assembly in accordance with the present invention.

DETAILED DESCRIPTION OF THE PREFERRED EMBODIMENT

Figure 1:
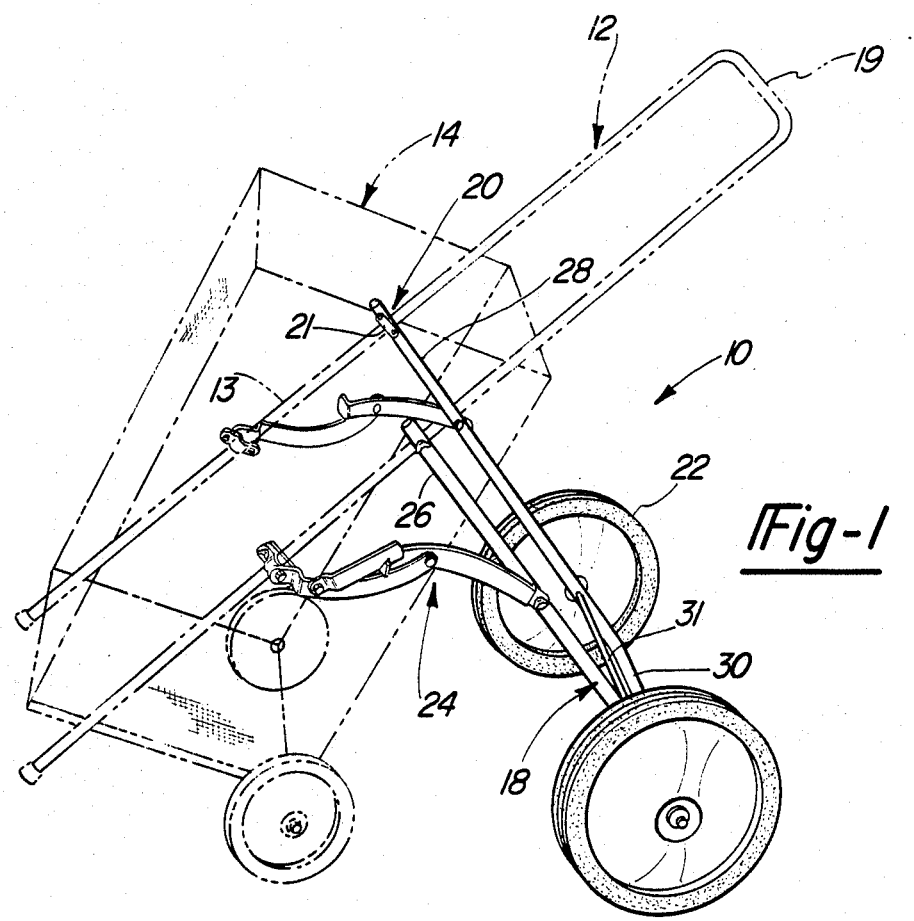
FIG. 1 is a perspective view of an auxiliary wheel assembly in accordance with the present invention associated with a phantom cart.
Figure 2:
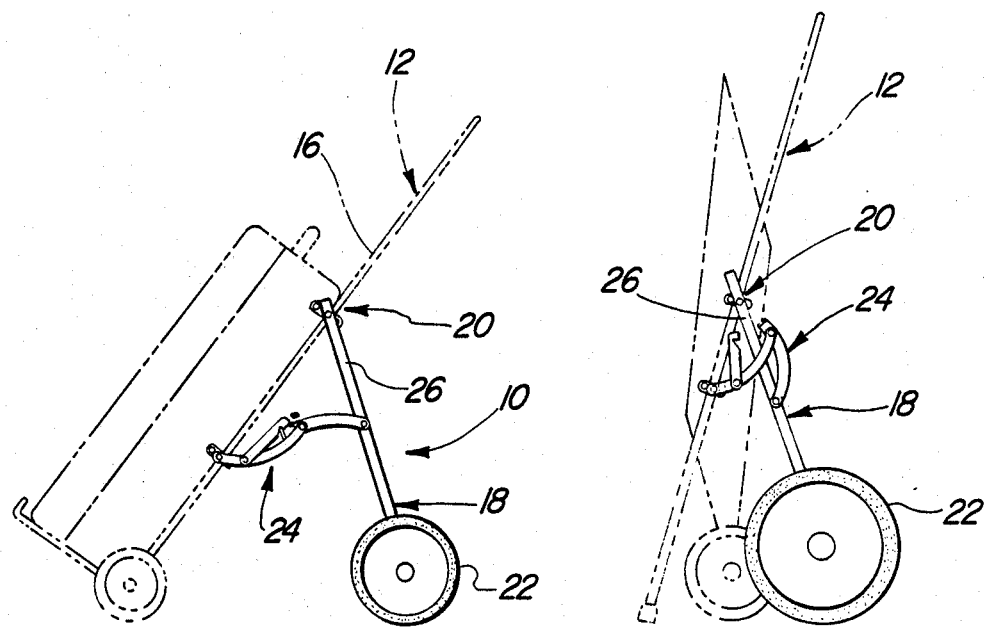
FIG. 2 is a side elevation view of the auxiliary wheel assembly of FIG. 1 associated with a phantom luggage carrier.

Referring to the Figures, an auxiliary wheel assembly is shown and designated with the reference numeral 10. As seen in FIGS. 1 and 2, the auxiliary wheel assembly 10 is coupled with a manually propelled carrier 12 such as a grocery cart 14 or luggage carrier 16. However, the present invention may be coupled with any type of manually propelled carrier having a frame with a one or more wheel design.

The auxiliary wheel assembly 10 generally includes a U-shaped frame 18; a mechanism 20 to secure the frame to a manually propelled wheeled vehicle 12; at least one wheel 22, preferably a pair of wheels to stabilize the manually propelled vehicle 12; and a bracket member 24 secured to the frame 18 in place with respect to the manually propelled wheeled vehicle 12 and to enable collapsing of the auxiliary wheel assembly 10.

The U-shaped frame 18 includes a pair of legs 26 and 28 which have their free ends coupled with the attachment mechanism 20. The base 30 of the U-shaped frame may act as an axle for the wheels 22, as seen in FIG. 8, or an axle 31 may be positioned adjacent to the base 30 secured by the legs 26 and 28. As will be explained herein, the base 30 may be expanded or contracted to enable attachment of the wheel assembly 10 to several devices.

The mechanisms 20 to attach the legs 26 and 28 of the U-shaped frame 18 to the manually propelled wheeled vehicle 12 are easily removable from the vehicle 12. Generally, a clip 21 is used that is either positioned all the way around a tube member 13 of the vehicle 12 and secured with a fastener or frictionally snaps onto a tube member of the wheeled vehicle 12. Thus, the mechanism 20 enables the auxiliary wheel assembly 10 to be moved from vehicle to vehicle as the user desires.

Figure 3:
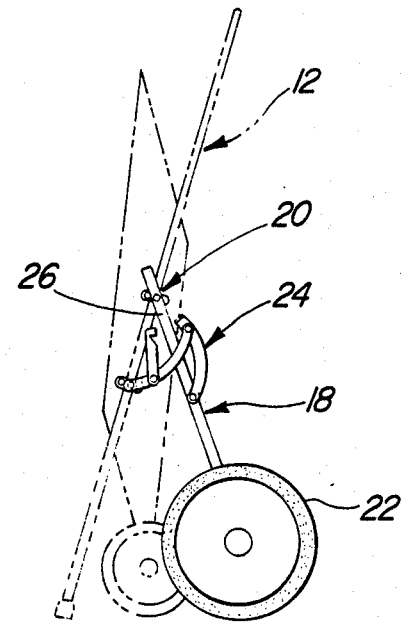
FIG. 3 is a side elevation view of the wheel assembly in a collapsed position on a phantom carrier.

The bracket mechanism 24 is generally of the scissors type. As seen in FIG. 4, the bracket generally includes a pair of arced members 32 and 34 which are secured by a pivot pin 35. Members 32 and 34 include a clip 31, bolt 33, or the like to removably secure the members 32 and 34 to the manually propelled wheeled vehicle 12 and frame 18, respectively, as seen in FIGS. 4 and 5. Also, a stop 36 may be positioned on one of the members 32 to prevent the hyperextension of the bracket 24. Thus, the bracket members 32 and 34 will stop moving once one member 34 contacts the stop 36 in its fully extended position, however, the bracket members 32 and 34 will still be able to move and fold into their collapsible position as seen in FIG. 3.

FIG. 5 illustrates another bracket 34 in accordance with the present invention. The bracket 34 is similar to the bracket of FIG. 4, members 32 and 34 are secured at one end by pivot pin 35. Also as explained above, mechanisms such as clips, bolts, or the like are used to attach the bracket members 32 and 34 to the wheeled vehicle 12 and U-shaped frame 18. A lock member 40 is secured by a pivot pin 41 to member 32 and coupled with the stop 36 to prevent the bracket from being moved in any direction while the wheel assembly 10 is in its first or use position. Thus, the lock 40 must be released to move the wheel assembly 10 to its second or collapsed position, as seen in FIG. 3.

The base 30 of the U-shaped frame 18 may include a mechanism 50 to expand and contract the base 30 which, in turn, changes the distance between the leg members 26 and 28, as seen in FIG. 6. Generally, the U-shaped frame would be formed of two L-shaped members 52 and 54 which include legs 26 and 28, respectively. The L-shaped members 52 and 54 are tubular with one of said members 54 being smaller in diameter than member 52 and including a spring leaf button 56. The other member 52 includes a series of apertures 58 to receive the spring leaf button 56. The spring leaf button 56 is engageable into its tubular member 54 and is able to slide in the other tubular member 52 until the spring leaf button 56 is positioned into any one of the series of the apertures 58. Thus, the width of the U-shaped frame 18 may be controlled and the U-shaped frame 18 may be utilized with several different types of manually propelled wheeled vehicles.

FIG. 7 illustrates a second embodiment of a frame member 18. An absorber 60 is positioned integrally in the legs 26 and 28 of the U-shaped frame 18 to enable the frame to carry heavier loads. The absorber 60 includes a housing 62 with a spring 64 and piston 66, nesting on the spring 64, to compensate for the load exerted downward on the handle 19. Thus, the absorber 60 enables heavier loads to be carried by the carrier without significantly increasing the downward force on the handle. Also, the absorber 60 could be a hydraulic or pneumatic type of shock absorber or dash pot to compensate for the downward force exerted on the handle 19.

Moving to FIG. 8, a second embodiment of the present invention is illustrated. In this embodiment the frame 18 is generally U-shaped and substantially the same as described herein with the base 30 acting as a wheel axle. The single wheel is adapted to couple with the base 30 so that only one wheel 22 is utilized. Also, the brackets 24 are associated with the U-shaped frame 18 to enable the frame to fold from a first position to a second position as explained above. Further, a member (shown in phantom) may be coupled to the base 30 to support a wheel and the member may include an absorber as explained above.

While the above describes the preferred embodiment of the present invention, it will become apparent to those skilled in the art that the present invention is subject to modification, variation, and alteration without deviating from the scope and fair meaning of the subjoined claims.

What is claimed is:

1. An auxiliary wheel assembly for manually propelled wheeled vehicles comprising:
   a U-shaped frame having a pair of free extending legs and a base;
   means coupled with said U-shaped frame base for expanding and contracting said frame for enabling said frame to be coupled with different manually propelled wheeled vehicles;
   a pair of friction clips on the free extending legs of said frame for removably attaching said frame to a manually propelled wheeled vehicle, said friction clips enabling quick connection and disconnection of the U-shaped frame from the manually propelled wheeled vehicle to enable said U-shaped frame to quickly connect and disconnect to other manually propelled wheeled vehicles;
   a pair of wheels coupled with said U-shaped frame; and
   a pair of scissor type brackets each having two ends, one end of each scissor type bracket coupled with one of said legs of said U-shaped frame, the other end of each scissor type bracket including a frictional fastener for securing said pair of scissor type brackets to said manually propelled wheeled vehicle, said friction fasteners enabling quick connection and disconnection of the scissor type brackets from the manually propelled wheeled vehicle to enable said pair of scissor type brackets to quickly connect and disconnect to other manually propelled wheeled vehicles, said pair of scissor type brackets enabling said auxiliary wheel assembly to be moved from a first extended use position wherein said wheels are in contact with a surface along with the wheels of said manually propelled wheeled vehicle to provide additional stability and to distribute load from said manually propelled wheeled vehicle to a second collapsed non-use position wherein said scissor type bracket substantially folds upon itself and said wheels are positioned out of contact with said surface.

2. The auxiliary wheel assembly according to claim 1 wherein said pair of scissor type brackets includes means for locking said brackets in said use position.

3. The auxiliary wheel assembly according to claim 1 further comprising means for absorbing shock during propulsion of said manually propelled wheeled vehicle, said means for absorbing being integral with the legs of said U-shaped frame.

4. The auxiliary wheel assembly according to claim 1 wherein said pair of scissor type brackets include a stop means for preventing hyperextension of said scissor type brackets.

* * * * *